(12) United States Patent
Boersma et al.

(10) Patent No.: US 12,270,764 B2
(45) Date of Patent: Apr. 8, 2025

(54) WAVEGUIDE WITH OUTER COATING FOR ANALYTE DETECTION

(71) Applicant: Nederlandse Organisatie voor toegepast-natuurwetenschappelijk onderzoek TNO, 's-Gravenhage (NL)

(72) Inventors: Arjen Boersma, Haaren (NL); Javier Nunez Villanueva, Eindhoven (NL); Evert Jonathan Van Den Ham, Wijk en Aalburg (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 282 days.

(21) Appl. No.: 17/924,151

(22) PCT Filed: May 12, 2021

(86) PCT No.: PCT/NL2021/050311
§ 371 (c)(1),
(2) Date: Nov. 9, 2022

(87) PCT Pub. No.: WO2021/230748
PCT Pub. Date: Nov. 18, 2021

(65) Prior Publication Data
US 2023/0184686 A1 Jun. 15, 2023

(30) Foreign Application Priority Data
May 15, 2020 (EP) ..................................... 20174969

(51) Int. Cl.
*G01N 21/77* (2006.01)
*C03C 25/106* (2018.01)
(Continued)

(52) U.S. Cl.
CPC ..... *G01N 21/7703* (2013.01); *C03C 25/1061* (2018.01); *G02B 6/10* (2013.01);
(Continued)

(58) Field of Classification Search
CPC ............. G01N 21/7703; G01N 21/774; G01N 21/7743; G01N 21/7746;
(Continued)

(56) References Cited

U.S. PATENT DOCUMENTS 5,745,231 A    4/1998  Groger et al.
6,487,326 B1 * 11/2002 Pantano ............. G01N 21/7703
                                                    385/38
(Continued)

FOREIGN PATENT DOCUMENTS

EP    0886141 A1    12/1998
EP    0909946 A2     4/1999
(Continued)

OTHER PUBLICATIONS

European Patent Office, International Search Report in corresponding International Application No. PCT/NL2021/050311, dated Aug. 5, 2021 (3 pages).

(Continued)

*Primary Examiner* — Charlie Y Peng
(74) *Attorney, Agent, or Firm* — Leydig, Voit & Mayer, Ltd.

(57) ABSTRACT

A method is described of manufacturing an optical sensing element for detecting a presence and/or determining a concentration of an analyte in a fluid medium, in particular in an aqueous medium. The optical sensing element includes an optical waveguide (e.g. an optical fiber) comprising an optically transparent material for guiding light through the sensing element along a flightpath. The optical sensing element further includes an inorganic coating for adsorbing (Continued)

the analyte from the fluid medium and an adhesion promotion layer formed between the optical waveguide and the inorganic coating. The adhesion promotion layer includes an adhesion promotion material for promoting adhesion of the inorganic material.

15 Claims, 7 Drawing Sheets

(51) Int. Cl.
    *G02B 6/10* (2006.01)
    *G02B 6/12* (2006.01)
(52) U.S. Cl.
    CPC . *G01N 2021/7716* (2013.01); *G01N 2430/00* (2013.01); *G02B 2006/12035* (2013.01); *G02B 2006/12138* (2013.01)
(58) Field of Classification Search
    CPC ... G01N 2021/7706; G01N 2021/7709; G01N 2021/7713; G01N 2021/7716; G01N 2021/772; G01N 2021/7723; G01N 2021/7726; G01N 2021/7736
    See application file for complete search history.

(56) References Cited

U.S. PATENT DOCUMENTS

| | | | |
|---|---|---|---|
| 6,801,677 | B1 | 10/2004 | Grace et al. |
| 9,921,164 | B2 | 3/2018 | Lu |
| 2002/0187350 | A1 | 12/2002 | Saccomanno et al. |
| 2006/0210436 | A1* | 9/2006 | Shenoy ............... G01N 21/553 422/68.1 |
| 2017/0138862 | A1* | 5/2017 | Boersma ............. B01J 20/3295 |
| 2021/0364442 | A1* | 11/2021 | Lin ......................... G01J 3/44 |

FOREIGN PATENT DOCUMENTS

| | | |
|---|---|---|
| EP | 1625386 A4 | 5/2007 |
| EP | 3591380 | 1/2020 |
| WO | WO 92/15862 A1 | 9/1992 |
| WO | WO 97/35181 A1 | 9/1997 |
| WO | WO 2009/082213 A1 | 7/2009 |
| WO | WO 2014151309 A1 | 9/2014 |
| WO | WO 2018/152479 A1 | 8/2018 |
| WO | WO 2019/170884 A1 | 9/2019 |

OTHER PUBLICATIONS

Bobby Pejcic et al., "Mid-Infrared Sensing of Organic Pollutants in Aqueous Environments," Sensors 2009, vol. 9, No. 8, pp. 6232-6253, XP008149318.

M. Karlowatz et al., "Simultaneous Quantitative Determination of Benzene, Toluene, and Xylenes in Water Using Mid-Infrared Evanescent Field Spectroscopy," Analytical Chemistry 2004, vol. 76, No. 9, pp. 2643-2648, May 1, 2004.

Pao Tai Lin et al., "Label-free water sensors using hybrid polymer-dielectric mid-infrared optical waveguides," ACS Applied Materials and Interfaces 2015, 7, pp. 11189-11194.

Charles Heath et al., "The Effect of Pressure and Temperature on Mid-Infrared Sensing of Dissolved Hydrocarbons in Water," Analytical Chemistry 2017, 89, pp. 13391-13397.

Kewang Chen et al., "Characterization of gas absorption modules based on flexible mid-infrared hollow waveguides," Sensors 2019, 19, pp. 1698.

Florian Rauh et al., "A mid-infrared sensor for the determination of perfluorocarbon-based compounds in aquatic systems for geosequestration purposes," Talanta 130 (2014), pp. 527-535.

Wesley Kendall, et al., "Silver/polymer coated hollow glass waveguides for mid-IR transmission," Proceedings of SPIE 2017, vol. 10058, pp. 100580Z-1 to 100580Z-16.

* cited by examiner

WAVEGUIDE WITH OUTER COATING FOR ANALYTE DETECTION

CROSS-REFERENCE TO RELATED APPLICATIONS

This patent application is a U.S. National Phase of PCT International Application No. PCT/NL2021/050311, filed May 12, 2021, which claims priority to European Application No. 20174969.4, filed May 15, 2020, which are both expressly incorporated by reference in their entireties, including any references contained therein.

TECHNICAL FIELD AND BACKGROUND

The present disclosure relates to spectroscopic detection of analytes. In particular, the detection present disclosure relates to an optical sensing element comprising a waveguide and an outer coating for adsorbing said analyte, systems comprising such element, the use thereof, and a method of manufacturing said element.

Measuring very low concentrations of analytes, e.g., contaminates, in liquid and/or gaseous media currently typically requires large, e.g., stationary, spectroscopic hardware available in a select number of laboratory facilities. In view of ever increasing requirements for monitoring of environmental quality and personnel protection, demand for on-site monitoring of air and/or water quality is increasing. Accordingly, demand for more readily available, smaller and/or lower cost tools or systems is increasing.

Existing solutions include laboratory setups such as GC-MS, cavity ringdown spectrometers, etc. Or tuneable laser spectrometers. Inexpensive solutions such as metal oxide or electrochemical gas sensors have relatively poor selectivity for the gases to be detected. The existing solutions are generally expensive and large. Small multi parameter sensors that can selectively analyse at ppb level (at a ng/g level) are not commercially available. Infrared solutions offer good selectivity, but typically require a long path length of light through the sample to be detected in order to be able to measure low concentrations.

Solid waveguides (e.g., optical fibers) can be used for some liquid sensors using evanescent field spectroscopy (also sometimes referred to as 'internal reflection spectroscopy'). Karlowatz et al describe in Analytical Chemistry, 2004, 76 (9), pp. 2643-2648 a use of mid-infrared spectroscopy for simultaneous detection and quantification of the analytes benzene, toluene, and the three xylene isomers. The analytes are enriched into a thin layer of a protective hydrophobic ethylene/propylene polymer that is provided onto the surface of a trapezoidal ZnSe ATR crystal. Direct detection of analytes permeating into the polymer coating upon contacting the coated crystal to an aqueous sample is performed by utilizing evanescent field spectroscopy in the mid-infrared (MIR) spectrum. Disadvantageously, applicability is limited, e.g., due to toxicity and danger of ZnSe to the environment, e.g., upon contact of the material with aqueous acids. Further, applicability in view of the protective non polar polymer coating applicability is limited to detection of non polar analytes. Further sensitivity can be limited due to a comparatively short total sample path length provided by ATR crystals. Longer waveguides, e.g., polymer coated fibers, are known, but as argued in a review by Pejcic at al in Sensors 2009, 9, 6232-6253, ATR crystals were found to offer higher sensitivity.

SUMMARY

Aspects of the present disclosure relate to a method of manufacturing an optical sensing element for detecting a presence and/or determining a concentration of an analyte in a fluid medium, which can be liquid or gaseous.

The method of manufacturing the optical sensing element comprising providing an optical waveguide comprising, or essentially consisting of, an optically transparent material for guiding light through the sensing element, depositing an inorganic coating comprising an inorganic material for adsorbing the analyte from the fluid medium; wherein, prior to depositing the inorganic coating, an adhesion promotion material or precursor thereof, is deposited onto the optically transparent material, to form an adhesion promotion layer for promoting adhesion of the inorganic material as compared to an adhesive strength without said intermediate layer. Inventors found that provision of the coating and/or the adhesion promotion layers as described herein mitigates one or more of the listed disadvantages of known sensing elements and/or offers one or more benefits as described herein.

Provision of the adhesion promotion layer 13 or precursor thereof as described herein was found to mitigate problems relating to coating stability enabling manufacturing of reliably coated elongate optical waveguides, e.g., fibers such as metal halide fiber. By using the adhesion promotion material as described herein negative effects, e.g., poor adhesion of the coating to the, optical sensing element, e.g. fiber, and overlapping spectral absorption, e.g. of the coating with analytes to be detected can be mitigated. Alternatively, or in addition, long term stability of the coating can be improved, in particular when the optical sensing element is used in combination with liquid media. Combination of the optical waveguide with an analyte concentrating inorganic coating material as described, was found to allow detection of a broad range of analytes, e.g., water soluble polar organic compounds, ions, gasses and vapors, even with the optical sensing element in direct contact with water. Advantageously, the optical waveguide can be an elongate optical waveguide, e.g., a fiber improving a detection limit for a target analyte. In some embodiments, there is provided a fiber having a low flexural rigidity allowing the manufacturing of relatively compact optical sensing elements and/or systems.

In one embodiment, the method of manufacturing an optical sensing element for detecting an analyte in a fluid medium comprises: providing an optical waveguide comprising or formed of an optically transparent material that comprises or essentially consists of a metal halide for guiding light through the sensing element; depositing an inorganic coating that comprises or essentially consists of an inorganic material for adsorbing the analyte from the fluid medium; and, prior to depositing the inorganic coating, deposition of an adhesion promotion material or precursor thereof onto the optically transparent material to form an inorganic adhesion promotion layer that comprises or essentially consists of a metalloid, a metal, a metal oxide, a metalloid oxide, or mixtures thereof for promoting adhesion of the inorganic material.

In one embodiment, the optical sensing element for detecting an analyte in a fluid medium comprises: an optical waveguide that comprises or is formed of an optically transparent material that comprises or essentially consists of a metal halide for guiding light through the sensing element; an inorganic coating that comprises or essentially consists of an inorganic material for adsorbing the analyte from the fluid medium; wherein, an inorganic adhesion promotion layer is formed between the optical waveguide and the inorganic coating, wherein the inorganic adhesion promotion layer comprises or is formed of an adhesion promotion material that comprises or essentially consists a metalloid, a metal, a metal oxide, a metalloid oxide, or mixtures thereof for promoting adhesion of the inorganic material.

Further aspects of the present disclosure relate to a system comprising said element and a method or use of said element for detecting a presence and/or determining a concentration of an analyte in a fluid medium. In one embodiment, the use relates to the detection of pnictogen compounds as analyte. In a preferred embodiment, the optical sensing element is sensitive to analytes having a group-V element or pnictogen bound to oxide, most preferably at least phosphate or phosphonate compounds. The use comprising contacting an optical sensing element as described herein, wherein the inorganic coating comprises zirconium oxide and/or zirconium hydroxide, with a medium, e.g., an aqueous medium, to be tested for a presence of said analyte. In some embodiments, the use comprises regenerating the inorganic coating by exposing said coating to an alkaline aqueous solution having a pH in excess of nine. Alternatively, or in addition, phosphorous compounds (e.g. dimethylmethylphosphonate, or warfare agents) in air can be detected using the same zirconium based coating. Regeneration can be provided by removing the optical sensing element from the gas. An increased relative humidity was found to accelerate the regeneration.

The system for detecting a target analyte comprised in a fluid medium, comprises a light source for generating light, preferably MID infrared light, a detector for measuring an absorbance of said light, and an optical sensing element as described herein or obtained by a method of manufacturing as described herein. The optical sensing element is, al least during use, positioned along a light path between the light source and the detector, wherein the optical waveguide is arranged to guide the light from the light source towards the detector via a light path, wherein at least a portion of the light path overlaps with the inorganic coating to allow the light to interact with the analyte.

BRIEF DESCRIPTION OF DRAWINGS

These and other features, aspects, and advantages of the apparatus, systems and methods of the present disclosure will become better understood from the following description, appended claims, and accompanying drawing wherein:

DESCRIPTION OF EMBODIMENTS

Figure 1A:
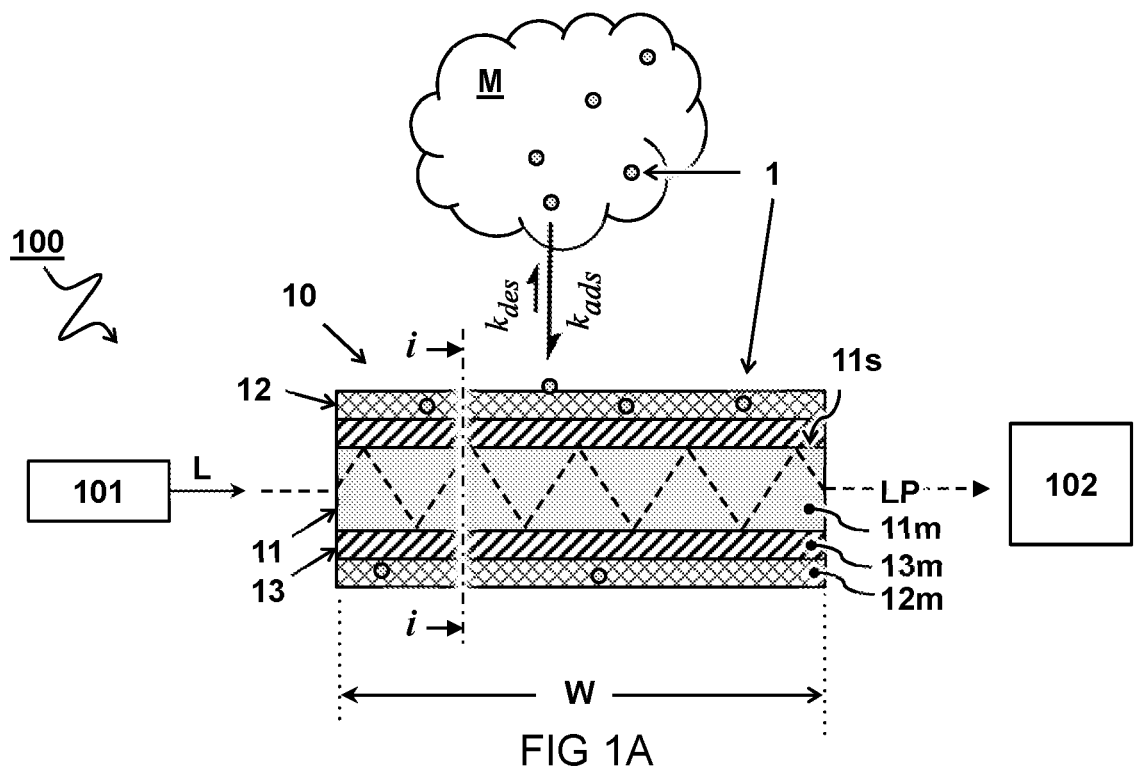
FIG. 1A illustrates a cross-section side view image of an analyte 1 detector system.

Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise.

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

Aspects of the present disclosure relate to a detector system 100 for detecting a presence and/or concentration an analyte 1 in a medium M. FIG. 1A illustrates a cross-section side view image of an analyte 1 detector system 100 comprising an embodiment of an optical sensing element 10. The optical sensing element 10 comprises an optical waveguide 11 of a solid waveguide material 11m with an inorganic coating 12 of an inorganic material 12m provided along an outer surface 11s of the optical waveguide 11. Preferably, an adhesion promotion layer 13 of an adhesion promotion material 13m is disposed between the optical waveguide 11 and the inorganic coating 12. The optical sensing element 10 can be used in a detector system 100 for detecting a presence and/or concentration of a target analyte 1 comprised in a liquid medium M. Alternatively, or in addition, the optical sensing element 10 can be used in a system for detecting a presence and/or concentration of a target analyte 1 comprised in a gaseous medium M. The detector system 100 uses optical spectroscopic principles, typically infra read spectroscopy, for the detection and/or quantification of the analyte. Use of optical spectroscopic principles, e.g., infrared spectroscopy can advantageously enables obtaining of a chemical fingerprint of the environment, allowing detection of a presence and/or concentration of a specific analyte within a complex mixture comprising further compounds.

The detector system (100) comprises: a light source (101) for generating light (L); a detector (102) for measuring an absorbance of the infrared light; and the optical sensing element (10) disposed in a light path (LP) between the light source (101) and the detector (102). Preferably, infrared light is used. Advantageously use of IR, preferably MID-IR, allows many analytes to be characterized due to a presence of specific bonds vibrating and interacting with the IR at characteristic energy Mid IR may be understood to relate to light having a wavelength in a range from two and a half to twenty five micrometer (approx. 4000-400 cm$^{-1}$). Accordingly, the light source 101 and detector 102 are respectively preferably arranged for emitting and detecting of IR light. In some embodiments, the detector system 100 is arranged as an FTIR system. Preferably, the detector system 100 is a portable system. Providing a portable system allows determining air and/or water quality at a site of interest, e.g., at a lake side. To this end the light source 101 and/or the detector 102 are preferably battery operated, e.g., comprise a battery arranged to sustain autonomous operation for a period at least longer than a detection time, e.g., a time of at least one hour. Alternatively, or in addition, non dispersive IR can be applied, by using a broadband light source and detector and optical filters. Alternatively, or in addition to infra red, the detector system 100 and optical waveguide 11 can be arranged to use spectroscopic methods based on light of other wavelengths, e.g., UV or visible light.

Preferably, the analyte 1 to be detected includes those comprising an oxide of group-V elements (pnictogens). For example, pnictogen compounds include compounds comprising a P—O and/or As—O bond, including but not limited to phosphates, phosphonates, and arsenates. Exemplary applications of the optical sensing element 10 include: detection of phosphate or arsenate levels in aqueous solutions and detection, e.g., gas or vapor phase detection, of phosphates, arsenates, such as organophosphates (also known as phosphate esters) and organoarsenates including many insecticides, fungicides, herbicides, nerve agents and flame retardants. Accordingly the optical sensing element 10 and/or coating the detector system 100 comprising the optical sensing element 10 can be used to benefit in water quality monitoring, preferably on-site water quality monitoring. Optionally, the optical sensing element 10 can be used for air quality monitoring, e.g., for the detection of toxic nerve agents. Optionally, the optical sensing element 10 can be used for the detection of one or more other analytes having a specific interaction with the infrared light L, organic compounds, inorganic compounds, e.g., a salt.

Preferably, the inorganic coating (12), e.g., the inorganic material 12*m*, is configured to adsorb, e.g., bind, the target analyte. A high affinity for binding an analyte may be expressed in terms of a binding or adsorption constant ($k_{ads}$), being at least a factor ten higher than a desorption constant ($k_{des}$). Preferably, the adsorption constant is at least a factor one hundred or more, e.g., at least one thousand, higher than the desorption constant. Advantageously absorbing the analyte is effectively concentrated from a comparatively lower concentration in a testing medium, e.g., river water, to a higher concentration at the coating. By concentrating the analyte 1 may improve a signal to noise value at the detector 102. Preferably the inorganic coating 12 is configured to concentrate the analyte by at least a factor of one hundred, preferably more, e.g., one thousand or one hundred thousand, e.g., in a range between one hundred and one million. Preferably, the coating 12 is further configured to specifically bind one class of analytes, e.g., phosphates, over an other class of analytes, e.g., alkanes. More preferably, the inorganic coating 12 is configured to specifically bind one or more particular species within a class, e.g., phosphate ions ($PO_4^-$), or phosphonate (C—PO(OR)$_2$ where each R may individually be an alkyl or aryl group). It will be appreciated that specific binding is not essential as advantageously analyte identification can be provided by analyte specific light adsorption, e.g., an obtained output of the detector, e.g., an IR spectrum.

As will be appreciated the adhesion promotion layer 13 can advantageously improve the structural integrity of the inorganic coating 12, e.g., over a period of use. For example, adhesion promotion layers 13, such as described herein, were find to improve durability of the inorganic coating 12, e.g., reducing abrasive damage. Particularly, provision of the adhesion promotion layer 13 was found to reduce delamination of the inorganic coating 12, e.g., upon contact of the optical sensing element 10 with liquids, e.g., water.

The optical waveguide 11 is configured to guide the infrared light L along a light path traversing one or more portion, preferably a plurality of portions, of the inorganic coating 12 allowing the light to interact with the analyte 1 at concentrated levels. Typically, the waveguide is a fiber, to benefit from a high surface to volume ratio. Interaction between the light and analyte typically takes place a portion of the inorganic coating 12 located within the evanescent field of light traveling within and reflecting of a surface 11*s* of the optical waveguide 11.

Preferably the optical waveguide 11, the adhesion promotion layer 13 and inorganic coating 12 have minimal interaction with the infrared light L. Preferably interaction is small over a broad range of frequencies, most preferably interaction is minimal for light with a wavelength between three to sixteen micrometer (μm), most preferably interaction is small over the whole MID-IR range. The less interaction of light with the carrier the smaller the contribution of interaction with the carrier to a detected signal and the larger the relative contribution of the analyte can be. Suitable carriers may be understood to be transparent carriers. Likewise, the coating is preferably a transparent coating, such that disturbance of the coating to a detected signal is minimized. Relevant analytes typically comprise organic groups. Preferably, the optical sensing element 10 is transparent for the light L. Transmittance can be understood as the ratio of intensity of light leaving the optical sensing element 10, e.g., towards the detector 102, over the intensity of light entering the optical sensing element 10, e.g., from the light source 101. Preferably, the transmittance of the optical sensing element 10 and each of its of its constituents is at least one percent, preferably more, e.g., at least ten percent. More preferably the transmittance is at least sixty percent, e.g., in a range between seventy percent or even ninety percent and one hundred percent. Preferably, the optical waveguide 11 has a propagation loss of less than ten decibel per meter (dB/m) in a MID infra red spectral range, preferably less than five dB/m or lower e.g., less than two dB/m, or even less, such as in a range between one and 0.1 dB/m. Providing a fiber with a low loss advantageously allows manufacturing of long coated waveguides, e.g., fibers with a length in a range between five millimeter and two hundred and fifty millimeter or more, e.g., five hundred millimeter.

Providing a coated optical waveguide 11 as described herein was found to advantageously allow detection of an analyte, e.g., polar solvents or ionic solvents such as phosphate ions, with a signal to noise ratio that is improved by a factor of one thousand or even one million or more, compared to classic FTIR without concentrating coating using a light path of equivalent length. Alternatively, or in addition, the light may travel through two or more coated waveguides, e.g., in a system comprising a plurality of coated optical waveguides 11, e.g., in the form of a coated window, disposed across a light path between the light source 101 and the detector 102. Further alternatively, or in addition, the light may travel through the one or more coated waveguides and reflect of an outer surface of one or more optical waveguides, e.g., in a system comprising a plurality of coated reflective optical waveguides, e.g., in the form of a coated mirror, disposed along a light path between the light source and the detector.

The optical sensing element 10 can be obtained by the method of manufacturing as disclosed herein. Accordingly, aspects of the present disclosure relate to the manufacturing of an optical sensing element 10.

Figure 1B:
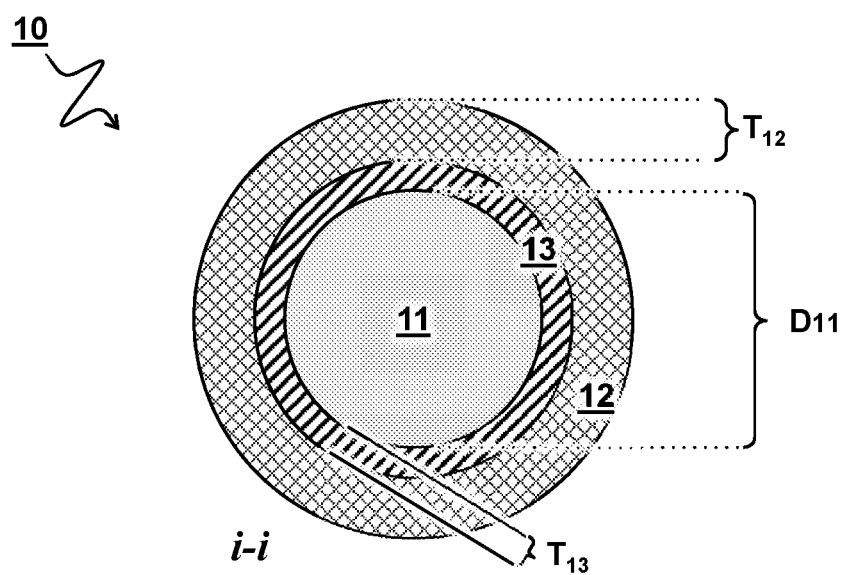
FIG. 1B illustrates a cross-section front view image of an optical sensing element.

FIG. 1B illustrates a cross-section front view image of an optical sensing element (10). In some embodiments, e.g., as shown, a method of manufacturing an optical sensing element 10, for detecting an analyte 1 in a fluid medium M, the method comprises providing an optical waveguide 11 comprising an optically transparent material 11m for guiding light L through the sensing element 10. The method further comprises depositing an inorganic coating 12 comprising an inorganic material 12m for adsorbing the analyte 1 from the fluid medium M. Preferably, the method comprises, prior to depositing the inorganic coating 12, depositing an adhesion promotion material 13m or precursor thereof, onto the optically transparent material 11m, to form an adhesion promotion layer 13. This can promote adhesion of the inorganic material 12m, e.g. as compared to an adhesive strength of the inorganic material 12m directly on the optically transparent material 11m without said promotion layer 13 there between.

As described herein, adhesion can be understood as a tendency of layers of different materials to cling to one another. Adhesion promotion can be understood as improving adhesion or bonding between layers of different materials. For example, an adhesion promotion layer can be provided between a set of two or more layers to provide a (durable) connection there between, whereas the layers would otherwise not adhere and/or bind directly to each other, or bind very poorly (not durable), at least less durable without the promotion adhesion layer than with the promotion adhesion layer. For example, the inorganic material 12m has a higher affinity for adhering to the adhesion promotion material 13m than to the optically transparent material 11m, e.g., providing an adhesion strength force per unit area higher by at least a factor two, three, five, ten, fifty, hundred, or more. Adhesive strength can be determined experimentally, e.g., using comparative flat substrate, with standard methods as specified by ASTM D4541-17. Alternatively or in addition, scratch testing methods as defined in ASTM standard C1624-05 can be employed to compare adhesion strength and mechanical failure modes of coatings deposited on surfaces with and without adhesion promotion layer 13.

Preferably, the optical waveguide 11, the inorganic coating 12, and the adhesion promotion layer 13 are formed of a solid material that is essentially insoluble in water. Use of an optically transparent material 11m, adhesion promotion material 13m, and/or inorganic material 12m that are essentially water insoluble can improve optical sensing element 10 integrity during an exposure to water.

The distance W (see FIG. 1A) over which the optical waveguide 11 is coated with inorganic coating 12 can depend on the application and/or target analyte. The distance W can be in a: range between five millimeter and two hundred and fifty millimeter or more, e.g., five hundred millimeter. The longer the distance over which the optical waveguide 11 is coated the more the guided light can interact with analyte in the coating. But if the distance W is too long, too much light can be lost in the waveguide, e.g. due to the optical loss of the fiber itself. Preferably, the optical waveguide is coated over a distance W, e.g., in range between ten and one hundred mm, e.g., ten or twenty millimeter. Preferably, the adhesion promotion layer 13 and the inorganic coating 12 are deposited along essentially the complete outer surface, e.g., the along the perimeter and/or the length, of the optical waveguide 11. It will be understood that, although a coating or adhesion promotion layer on end portions of the optical waveguide 11 may be tolerated, these end portions preferably remain uncoated, e.g., by not exposing end portions of the optical waveguide 11 to the respective deposition steps, and/or by temporarily shielding the end portions during layer deposition.

In a preferred embodiment, the materials described herein, such as the optically transparent material 11m, inorganic material 12m, and/or adhesion promotion material 13m, are relatively transparent, at least to mid IR light. For example, one or more, preferably all, of said materials 11m, 12m, 13m have a relatively low attenuation coefficient of less than one per centimeter ($cm^{-1}$), one per decimeter ($dm^{-1}$), or even less than one per meter ($m^{-1}$), e.g., as measured in a mid IR wavelength. Reflective adhesion promotion layers 13, e.g., metallic mirror layers, would disadvantageously reduce, or even prevent, interaction of light travelling within the optical waveguide 11 with analyte 1 in the inorganic coating.

A thickness of the optical waveguide 11, e.g., fiber diameter D1 can depend on an application type, e.g., type of analyte to be detected. The diameter D11 (see FIG. 1B) of the optical waveguide 11 may be depend on the application and/or target analyte diameter. The diameter can be in a range between ten micrometer and one millimeter mm. Preferably the diameter is in a range between fifty micrometer and one millimeter, e.g., five hundred micrometer. If the diameter is too large, a significant amount of light can be lost in the waveguide, e.g. due to the optical loss of the fiber itself. Lower diameters, reduce absorption of light within a unit length of optical waveguide 11. Lower diameters allow a more efficient use of waveguide material, i.e. a higher surface to volume ratio.

Figure 3:
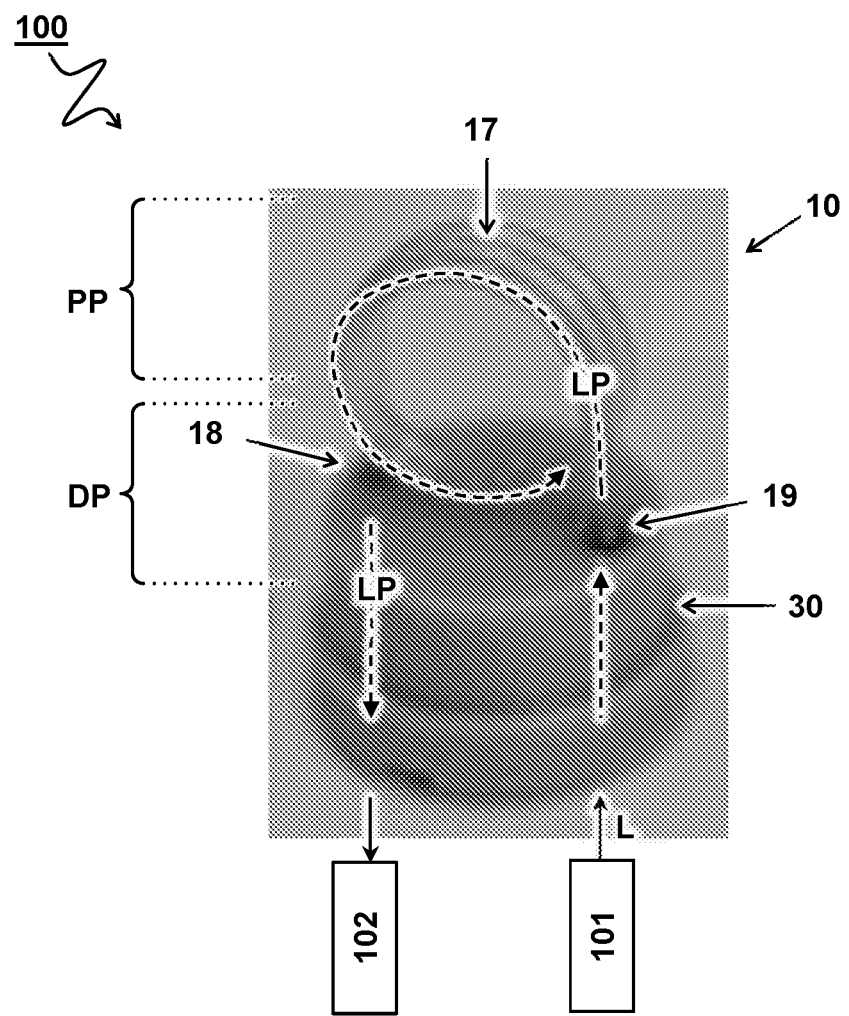
FIG. 3 depicts a detector system comprising an optical sensing element.

Smaller diameter waveguides, e.g., in a range between fifty and two hundred micrometer can advantageously reduce flexural rigidity of the optical waveguide. In a preferred embodiment, flexural rigidity of the optical sensing element 11 is such the optical waveguide 11 can be bent over a diameter of less than five cm or less, e.g., three cm, such as in a range between four and 0.5 cm, without essentially losing functionality of the optical sensing element 10, the adhesion promotion layer 13, and the inorganic coating 12. Flexing the optical waveguide 11 the optical sensing element 10 can allow manufacturing of an optical sensing element 10 having a reduced form-factor, e.g., a coil such as shown in FIG. 3, allowing the optical sensing element 10 to fit in comparatively small containers for medium M.

The adhesion promotion layer 13 is preferably as thin as possible without essentially losing adhesion promotion functionality. Thicker adhesion promotion layers disadvantageously reduce overlap distance between analyte and the light, e.g., the evanescent field and the light. Accordingly the thickness T13 of the adhesion promotion layer 13 is typically less than three hundred nanometer, preferably less, e.g., less than one hundred nanometer or less than fifty nanometer. More preferably, the adhesion promotion layer 13 is thinner, e.g., having a thickness between one to two monolayers or one nanometer and thirty nanometer, e.g., in a range between one and five nanometer. The thickness T12 of the inorganic coating 12 is in a range between one and one hundred micrometer or more, Thicker layers were found to not increase the interaction path length of the light with the analyte, since the effective penetration depth of the evanescent electromagnetic field into the layer is believed to be limited, e.g. to a depth of about 1-10 micrometer. An optimized (e.g. 5-10 micrometer) interaction path length was found to allow detection with improved signal to noise levels, e.g., reduced detection limit and increased sensitivity. Optionally inorganic coating 12 layers may be thicker, e.g., one hundred micrometer even one millimeter. However, thicker coating layers were found to provide limited additional benefit in signal to noise ratio. Excessively thick layers, e.g., above one hundred micrometer may disadvantageously increase equilibration times. Preferably the thickness T12 is in a range corresponding to a penetration depth of the evanescent field in the inorganic coating 12. A thickness T12 in a range between five hundred nanometer and 10 micrometer was found to provide a balance between response time and detection limit.

In a preferred embodiment, the optical waveguide 11 is formed of composition comprising a metal halide. Metal halides, such as silver halides, alkali- and earth-alkali metals such as NaBr or $CaF_2$, can advantageously have an average transmission loss below 0.2 dB/m, over the relevant optical spectrum. For optical sensing element 10 that are to be contacted with water the metal halide has a low solubility in water, e.g., essentially insoluble, wherein a low solubility in water may be understood to a solubility of less than 0.1 milligram per liter (at twenty degrees Celsius), preferably lower, e.g., below 0.01 milligram per liter or below one microgram per liter. In some embodiments, wherein the optically transparent material 11$m$ comprises, or essentially consists of, a metal halide that is essentially insoluble in water and wherein the inorganic coating 12 comprises zirconium oxide.

Preferably the optical waveguide 11 comprises or essentially consists of a silver halide, preferably AgBr, AgI AgCl, or a combination thereof. Silver halides were advantageously found to combine optical low loss properties and low water solubility. Alternatively the optical waveguide 11 may be formed of metal halides having a higher water solubility. Optical waveguides 11 formed of a water soluble material, e.g., having a solubility in excess of one milligram per liter, are preferably coated with a protective coating before being exposed to water, or can only be used in gasses (gaseous media). As will be explained the adhesion promotion layer 13 can be configured to both promote adhesion of the inorganic coating 12 and to shield the underlying optical waveguide 11 from water and/or oxidation.

The inorganic coating 12 preferably has a high affinity for binding target analytes. Preferably the binding is reversible, allowing e.g., re-use of the optical sensing element 10 and use in environment with dynamically changing levels of analyte. The coating 12 is preferably transparent at the mid IR range or at least at relevant spectral absorption bands of the target analytes. Ceramic and/or inorganic coatings may be particularly suitable as a relative abundance of organic groups in a range below ten weight percent, preferably less, e.g., below five weight percent (wt %) or below one wt %, advantageously mitigates spectroscopic interference of organic constituents of the coating with an obtained spectrum of a target analyte. Inventors find that zirconium oxide ($ZrO_2$) or zirconium hydroxide or a combination thereof has a particular high affinity for oxides of group-V elements (pnictogens). Compounds found to bind include, but are not limited, to phosphates, phosphonates, and arsenates, such as organophosphates (also known as phosphate esters) and organo-arsenates including many insecticides, fungicides, herbicides, nerve agents, and flame retardants. Binding was found to take place both liquid and in gas phase. Furthermore, binding was found to be reversible in both phases. Exposing the inorganic coating 12 after contact with analytes to a medium, e.g., water, having a lower level of analytes, preferably an essentially zero level of analytes, was found to reduce a level of bound analyte. Regeneration was found to be faster at high pH. For gas or vapor phase analytes the release (regeneration) was found to be fast and essentially complete, e.g., within one hour or even within on minute at all humidity levels. In one embodiment, the optical sensing element is regenerated within several seconds by exposing it to gas, e.g. ambient air, at an increased relatively high relative humidity. A high relative humidity can be understood as a relative humidity in excess of ninety percent (at twenty five degrees Celsius), preferably in excess of ninety five percent up to one hundred percent. Preferably, in particular for sensors having a water soluble optical waveguide without a protective coating, the conductions are such as that there is essentially no condensation (below the dew point as to prevent water droplet formation.

As will be explained in more detail below detail, for embodiments that are arranged for detection of analytes, e.g., phosphate ions, in liquids, e.g. water, inventors find desorption can be accelerated up, e.g., by exposing the inorganic coating 12 to an aqueous alkaline solution. Alternatively or in addition, depending on a target analyte, other inorganic coating materials, e.g., ceramic materials, may be employed. Particularly, inventors envision a use of porous fully ceramic coatings, e.g., zeolites, or porous partly inorganic coatings, e.g. Metal Organic Frameworks, the pores of which provide a size-depended affinity of analyte binding. Optionally, analyte affinity can be tuned by interaction promotors, e.g., self-assembled monolayers.

Inventors find a that it is difficult to reliably deposit an inorganic coating (12) directly onto a metal-halide surface. Coatings tend to be incomplete, non-uniform and/or unstable. Inorganic coating (12) layers, e.g., Zirconium oxide, deposited directly onto the optical waveguide (11), e.g., an AgBr/AgCl fiber, were found to be prone to delamination, e.g., upon abrasive contact, flexing of the wire, and/or even upon prolonged contact with a liquid medium, e.g., water. Without the aim to be bound by any theory inventors find difficulties to relate to poor adhesive properties of the metal halide surface. In some embodiments, wherein the adhesion promotion layer 13 is configured to provide surface hydroxyl groups for improving adhesion of the inorganic coating 12 at least during deposition of the inorganic coating 12. For example, the adhesion promotion material 13$m$ can be configured to have surface hydroxyl groups and/or form surface hydroxyl groups after deposition. Alternatively, or in addition, the precursor thereto can be configured to have surface hydroxyl groups, e.g., after conversion to the adhesion promotion layer 13. Inventors find that application of a coating, e.g., as describe herein, can be improved, e.g., yielding more uniform, more reliable and/or more stable (durable) coatings by providing an adhesion promotion layer. Preferably, the adhesion promotion layer 13 is configured to have surface hydroxyl groups for improving adhesion of the inorganic coating 12. It was further found that an adhesion promotion layer 13 having surface hydroxyl groups can advantageously improve homogeneity of the inorganic coating 12 along the optical waveguide 11. Without wishing to be bound by any theory inventors find improved homogeneity of the coating deposited on the adhesion promotion layer 13, compared to coatings deposited directly on the optical waveguide 11, relates to lowered surface energy, improving the wetting, e.g., during an inorganic coating 12 layer deposition step. In some embodiments, the adhesion promotion layer comprises, or essentially consists of, metalloids, metals, silicon oxides, metal oxides, or mixtures thereof. In a preferred embodiment, the metal is selected from a group of aluminum, chromium, zinc, and titanium. Accordingly, in a preferred embodiment, the adhesion promotion layer comprises an oxide of a metalloid, a metal, an oxide of a metal, or a mixture thereof. Inventors find inorganic coating 12 layers as described herein that are deposited on an adhesion promotion layer 13 comprising oxides of metalloids, e.g., silicon oxide, metals, oxides of metals, and mixtures thereof to have improved adhesion and/or homogeneity. Preferably, the adhesion promotion layer 13 comprises, or consists essentially of oxides of aluminum, chromium, zinc, titanium, silicon, or mixtures thereof. Oxides, e.g., native oxides layers on dense layers of aluminum, chromium, zinc, titanium, and silicon or combinations thereof, were found to not only provide beneficial adhesive properties but also form a passivation layer, e.g., a skin, protecting the underlying optical waveguide 11 e.g., from oxidation and/or from direct contact with water.

Figure 2:
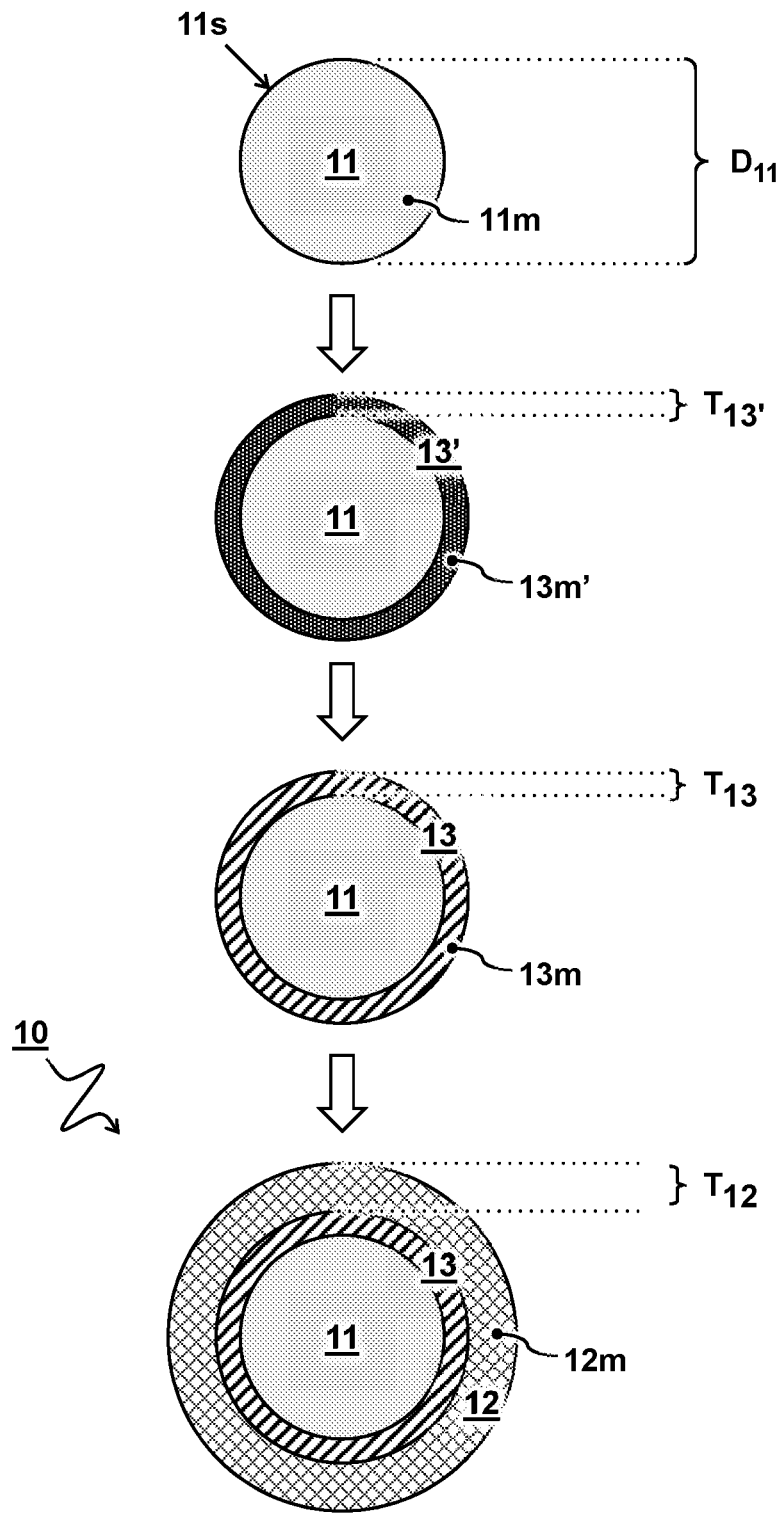
FIG. 2 illustrates cross-section views of an optical sensing element at various stages of completion during manufacturing.

FIG. 2 illustrates cross-section views of an optical sensing element 10 at various stages of completion during manufacturing. As depicted in FIG. 2 the method of manufacturing an optical sensing element 10 comprises providing an optical waveguide 11 (top figure). As depicted in the bottom figure the method further comprises depositing an inorganic coating 12 layer. In some embodiments, the adhesion promotion layer 13 may be deposited directly onto the optical waveguide 11. In a preferred embodiment, depositing the 13' adhesion promotion layer 13 comprises, e.g., is split up in, a number of steps, comprising providing a precursor layer 13' and converting the precursor layer 13' into the adhesion promotion layer 13.

In some embodiments, depositing the adhesion promotion layer 13 comprises depositing a precursor film 13', e.g. a metal film 13'. The metal film being a precursor to the adhesion promotion layer 13. After deposition the metal film the method comprises the step of oxidizing said metal film (to form the adhesion promotion layer 13). Inventors surprisingly found that a metal oxide or metalloid oxide adhesion promotion layer 13 may advantageously be attained by initial deposition of a metal or metalloid precursor film followed by conversion, e.g., oxidation, of the precursor layer 13' to form the adhesion promotion layer 13, despite the general notion that metallic layers, e.g., layers of aluminum, chromium, zinc, and titanium, and layers of silicon can be highly reflective for light at the mid-IR range. Deposition of the precursor layer 13' may be attained by any suitable deposition means including but not limited to electro (less) deposition and vapor deposition. Preferably the precursor layer 13' is deposited by vapor deposition e.g., physical vapor deposition, as vapor deposition methods can advantageously be used for homogeneous deposition of a broad range of materials. Following precursor layer 13' deposition the precursor layer 13' is oxidized. Oxidation of the precursor layer 13' converts the film from metallic or metalloid to an oxidic character having adhesive properties as described herein. To ascertain transparent character of the precursor layer 13' the precursor layer 13' is preferably essentially completely oxidized. Complete oxidation may be understood to result in oxidized layers having essentially no detectable metallic, e.g., reflective, character. Oxidation may comprise stimulated oxidation, e.g., thermal oxidation in the presence of an oxidant, e.g., air. Preferably, oxidation comprises native oxidation, e.g., by exposure to water or ambient air without purposive addition of heat. Omission of a purposive heating step improves manufacturability. To ascertain complete oxidation of the precursor layer 13' said precursor layer, e.g., metal or metalloid film, preferably has a thickness T13' below a corresponding thickness of the respective native oxide layer. Inventors find that layers of such native oxides (e.g., by exposure to water and/or ambient) have: a thickness in a range below ten nm, e.g., between one and nine nanometer for Al; a thickness in a range below three nanometer, e.g., between 0.5 and two nanometer for Si, Cr, and Ti. The thickness of the corresponding precursor metal films or metalloid films is adjusted accordingly, i.e. such that the complete film can be converted to oxide by exposure to water and/or ambient air. Typically, suitable precursor film thickness prior to conversion by exposure to ambient is half of the thickness of the corresponding generated oxide. Accordingly, in one embodiment, deposition of the adhesion promotion layer 13 comprises vapor deposition of an aluminum film or precursor thereto having a thickness in a range between three and twelve nanometer, and wherein said film is suitably oxidized, e.g., by exposure to moisture, oxygen and/or ozone. Optionally, the precursor films can be thicker. Thicker precursor layer 13' can be converted by stimulated oxidation, e.g., thermal oxidation or chemical oxidation, e.g., in the presence of an oxidant with a higher reactivity than ambient air, e.g., pure oxygen, ozone, an oxygen-plasma, or a peroxide.

Inventors found that deposition advantageously can be carried out with relatively simple wet, e.g., wet-chemical, deposition method. Inventors find the presence of surface oxides and or surface hydroxyls on the adhesion promotion layer 13 reduces surface energy which can allow formation of a homogeneous layer of a liquid phase, e.g., water or an other polar solvent, comprising a solution of inorganic material 12 precursor or suspension of inorganic coating 12 material. After drying, e.g., vacuum drying, it was found that the optical waveguide 11 was provided with a stable layer of the inorganic coating 12 material. Advantageously a separate oxidation step to convert a metal precursor film to the adhesion promotion layer 13 can be omitted if the inorganic precursor film of coating material 12 is deposited from an aqueous solution. Accordingly, in some embodiments, the inorganic coating 12 is deposited in a wet chemical deposition step. For example, a wet chemical deposition process comprising exposing e.g., dipping or spraying the optical waveguide 11 including the deposited adhesion promotion layer 13, to an aqueous dispersion comprising inorganic particles, e.g., zirconium oxide nanoparticles, to form a wet film comprising said nanoparticles, and drying said film to form an adhesion promotion layer with a dry coating of said inorganic articles. Preferably the inorganic coating 12 material is deposited as a suspension of nanoparticles, e.g., zirconium oxide nanoparticles, in a polar dispersant, e.g., water and lower alcohols. Deposition of inorganic or ceramic nanoparticles can advantageously result in the formation of a porous inorganic coating 12. Inventors find porous inorganic coating 12 coatings can advantageously have better overall accessibility for analytes compared to dense inorganic coating 12, resulting in improved absorption rates and lowered response time. Nanoparticles of other inorganic coating 12 materials may likewise be deposited from suspension. The term nanoparticles may be understood to relate to particulate matter having at least one dimension in a range between one nanometer and one thousand nanometer. Preferably the nanoparticles have an average dimension ($d_{90}$) within one and five hundred nanometer or within five and two hundred nanometer. Smaller nanoparticles can lead to comparatively denser films having smaller yet a higher number of voids along with a higher overall surface area allowing sorption of more analyte compared to films of comparatively larger particles, e.g., micro particles or compared to films comprising essentially no voids for analyte transport, e.g., dense films. The concentration of particles in suspension can depend on a target thickness T12 of the inorganic coating 12 layer. A suitable concentration can be determined experimentally, e.g., by measuring thickness of formed films deposited on comparative flat substrates of similar composition. Typically the concentration of nanoparticles is in a range between one and one hundred milligram per milliliter. Alternatively, or in addition, the inorganic coating 12 may be deposited by an in situ synthesis, e.g. from precursors such as zirconium isopropoxide or other metal alkoxides. Alternatively, or in addition, zeolite-based inorganic coatings 12 may be deposited by exposing the optical waveguide 11 with adhesion promotion layer 13 to an sol-gel process step as known in the field. Further, alternative deposition methods may be understood to include magnetron sputtering, chemical vapor deposition, atomic layer deposition and/or molecular deposition methods.

Further aspects of the present disclosure relate to a method, e.g., use of a detector system 100 comprising the optical sensing element 10 according to the present disclosure for the detection of a presence of an analyte 1 in a liquid fluid medium M and/or for the quantification thereof. In one embodiment, the optical sensing element, wherein the inorganic coating comprises zirconium oxide is used for the detection of a pnictogen analyte 1. The use comprising contacting at least a portion of the inorganic coating 12 with a medium to be tested for a presence of said analyte 1, measuring or recording an absorption spectrum of light guided through the optical waveguide 11, and comparing an absorption intensity at an analyte specific peak position in said spectrum to a calibration value, e.g., a calibration value of a corresponding calibration spectrum obtained in the presence of a known concentration of the analyte. In some embodiments, the use comprises regenerating the inorganic coating by exposing said coating to an alkaline aqueous solution having a pH in excess of nine.

Further aspects of the present disclosure relate to the optical sensing element 10. For example, the optical sensing element 10 can be obtained or obtainable by the method of manufacturing as disclosed, or otherwise. FIG. 3 depicts an embodiment of an detector system 100 comprising an optical sensing element 10 manufactured according to the method described herein. It will be understood that, the optical sensing element 10 can comprise one or more other or alternative the features, or combinations of features, as described in relation to the method of manufacturing the optical sensing element 10.

In one embodiment, e.g., as shown, the optical sensing element 10 for detecting an analyte 1 in a fluid medium M comprises: an optical waveguide 11 comprising an optically transparent material 11m for guiding light L through the sensing element 10; an inorganic coating 12 comprising an inorganic material 12m for adsorbing the analyte 1 from the fluid medium M. In a preferred embodiment, e.g., as shown, an adhesion promotion layer 13 is formed between the optical waveguide 11 and the inorganic coating 12, wherein the adhesion promotion layer 13 comprises adhesion promotion material 13m for promoting adhesion of the inorganic material 12m. Optionally, the optical sensing element 10 comprises a grip 30 or a holder for fixing a position of the optical waveguide 11 with the coating layers. The grip 30 can be provided with one or more connectors for interfacing with the light source 101 and/or detector 102. Preferably, one or both distal ends 18,19 of the optical waveguide 11 are provided with a connectors configured to receive a distal end of an optic fiber. Alternatively, the grip and/or the connectors can be provided as one ore more separate parts configured for reversibly receiving an optical sensing element 10 and/or connecting to the light source 101 and/or the detector 102.

The waveguide may be obtained from Art Photonics. After forming the optical sensing element it can be directly attached to infrared transparent fibers of a fiber probe coupler, e.g. on a Thermofisher Nicolet FTIR spectrometer.

In another or further preferred embodiment, the optical sensing element 10 has a proximal part PP including at least a central portion 17 of the optical sensing element 10, and a distal part DP including both terminal end portions 18,19 of the optical waveguide 11. Positioning the terminal end portions 18,19 on one of the optical sensing element 10 and positioning the at least part of the inorganic coating 12, e.g., a central portion 17 of the optical sensing element 10, on an other end of the optical sensing element 10 that is distant from the terminal ends, allows contacting the inorganic coating 12 to a medium, e.g., an aqueous medium for detecting a presence of an analyte 1, without contacting the connectors and/or optical fibers to said medium. Accordingly, the optical sensing element 10 can advantageously be arranged in a form of a dip-stick having its analyte sensitive contact area on end and other system components, e.g., connectors and electrical components, such as the light source at an opposite side. Accordingly, the optical sensing element 10 can allowing testing of a medium, e.g., river water, without contaminating other parts of the detector system 100. Arranging the optical waveguide 11 in a from of a coil, e.g., as shown in FIG. 3, having at least two, three, or more loops, can allow manufacturing of an optical sensing element 10 that is relatively compact for per unit surface area of the inorganic coating 12, e.g., as compared to an optical sensing element 10 having a straight optical waveguide 11 of comparable dimension.

In some preferred embodiments, the optical waveguide 11 is essentially formed of a silver halide, the inorganic coating 12 is essentially formed of zirconium oxide and/or zirconium hydroxide, and the adhesion promotion layer 13 is essentially consisting of a metal, an oxide of a metal and/or metalloid, such as aluminum oxide Further aspects of the present disclosure relate to a detector system 100 comprising the optical sensing element 10 according to the present disclosure for the detection of an analyte 1.

Figure 4A:
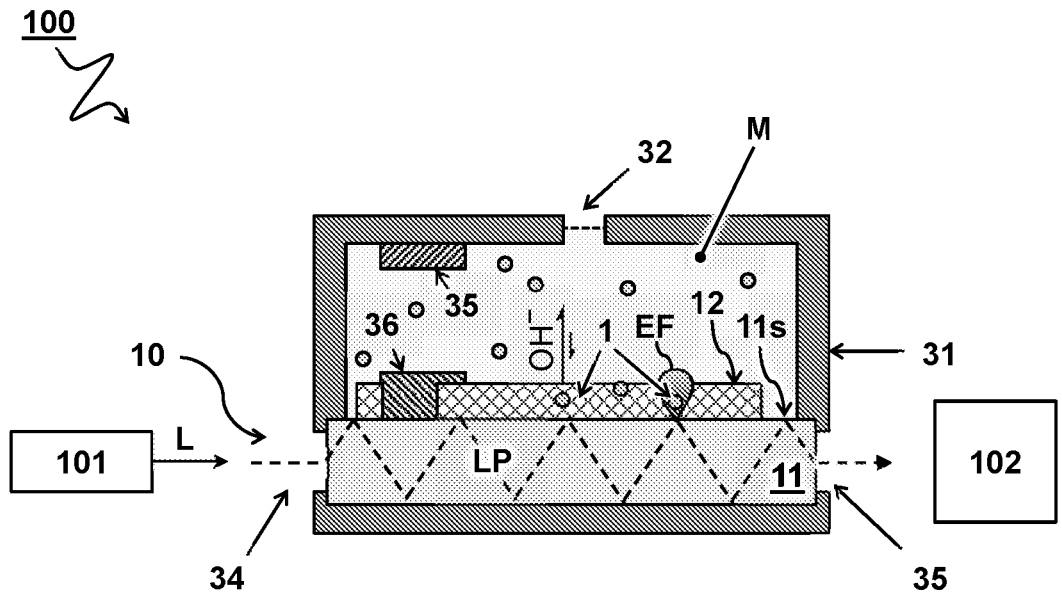
FIGS. 4A and B depict detector systems comprising an optical sensing element.
Figure 4B:
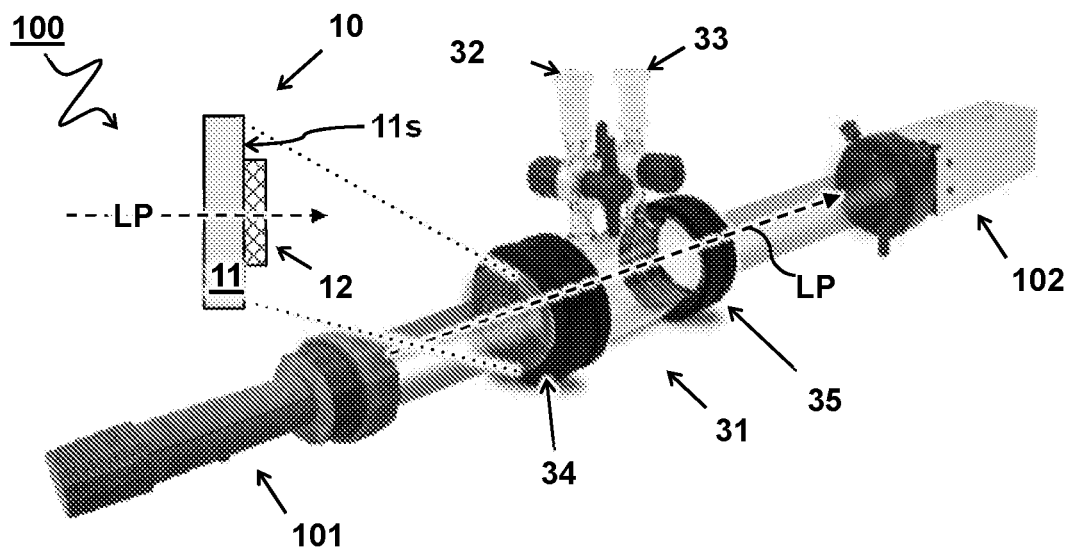

FIGS. 4A and B illustrate embodiments of a detector system 100 comprising an optical sensing element 10 and a housing 31. In some embodiments, e.g., as shown, the detector system 100 comprises: a light source 101 for generating light L, a detector 102 for measuring an absorbance of the light, and an optical sensing element 10. The optical sensing element 10 is positioned along a light path LP between the light source 101 and the detector 102. Preferably, the optical waveguide 11 is arranged 11 to guide the light L from the light source 101 entering the optical sensing element 10 at a first terminal end towards the detector 102 from a second terminal end via a light path LP wherein at least a portion of the light path LP, e.g., the evanescent field EF, overlaps with the inorganic coating 12 to allow the light L to interact with the analyte 1. Note that the system also includes an adhesion promotion layer as specified herein but that said layer is not shown to ease understanding of the figure. In some embodiments, e.g., as shown in FIGS. 4A and 4B, the detector system 100 comprises a housing 31 enclosing at least a portion of the optical waveguide 11 with the inorganic coating 12. In some embodiments, the housing 31 and optical sensing element 10 form an integral part. Preferably, the housing 31 is provided as a separate part configured to reversible receive the optical waveguide 11. The housing 31, e.g., as shown in FIG. 4A, comprises at least one opening 32. The opening configured to allow passage of the medium M, e.g., to and from the enclosed volume. Preferably, the housing includes at a least a first 34 and second passage 35 configured to allow light to respectively enter and exit the optical waveguide 11. The passages can be formed of a transparent window. Alternatively, e.g., as shown in FIG. 4A, the passages can be openings arranged for holding, e.g., gripping, opposing end portions of the optical waveguide 11. In a preferred embodiment, the openings may be configured to include the connectors configured for reversibly connecting to the light source 101 and/or the detector 102. In some embodiments, the housing comprises a further opening 33 configured to allow passage of the medium. An optical sensing element 10 provided in housing comprising two openings to allow passage of the medium, e.g., as shown in FIG. 4A, can advantageously be used to monitor presence of an analyte in a continuous a flow of analyte.

In some embodiments, e.g., wherein the inorganic coating 12 comprises zirconium oxide and/or zirconium hydroxide, the detector system 100 includes a dispenser for on demand dispensing of an aqueous base to regenerate the inorganic coating 12. For example, during a regeneration cycle prior to and/or following an analyte detection measurement. The base can be supplied externally e.g., by exposing the inorganic coating 12 to an aqueous solution of said base, e.g., NaOH, KOH, and ammonia. To remove base residues the inorganic coating 12 can be rinsed, e.g., with water. It was found that alternatively, base residues be removed or dissolved in the medium to be analyzed. In some embodiments, the dispenser can be a container, e.g., a reservoir with a valve, configured to release a base in response to a regeneration trigger, e.g., an electrical trigger following an analyte detection measurement. In other or further embodiments, e.g., as shown in FIG. 4A, the detector system 100 comprises electrodes for in situ generation of hydroxide, e.g., electrochemically. For example, electrodes that are configured to perform an OH-generating half reaction at a first electrode in the vicinity of the inorganic coating 12 and a balancing half reaction at a second electrode positioned at a comparatively more distant position from the coating. In some embodiments, e.g., as shown in FIG. 4A, the optical sensing element 10, and/or the, the housing 31, may be provided with a means for regenerating the inorganic coating 12. For an inorganic coating 12 comprising zirconium oxide said regeneration may be understood to relate exposing the inorganic coating 12 to an alkaline aqueous solution having a pH in excess of nine, e.g., in a range between nine and eleven, preferably in a range between nine and ten In a preferred embodiment, e.g., as shown in FIG. 4A, the detector system 100 includes a housing 31, the housing enclosing at least a portion of the inorganic coating 12 and defining an internal volume at said portion for holding an aqueous medium comprising the analyte 1, and wherein the housing 31 further comprises a pair of electrodes 35,36 configured to electrochemically generate hydroxide species for regenerating the inorganic coating 12.

Example 1: Liquid Detection

Figure 5:
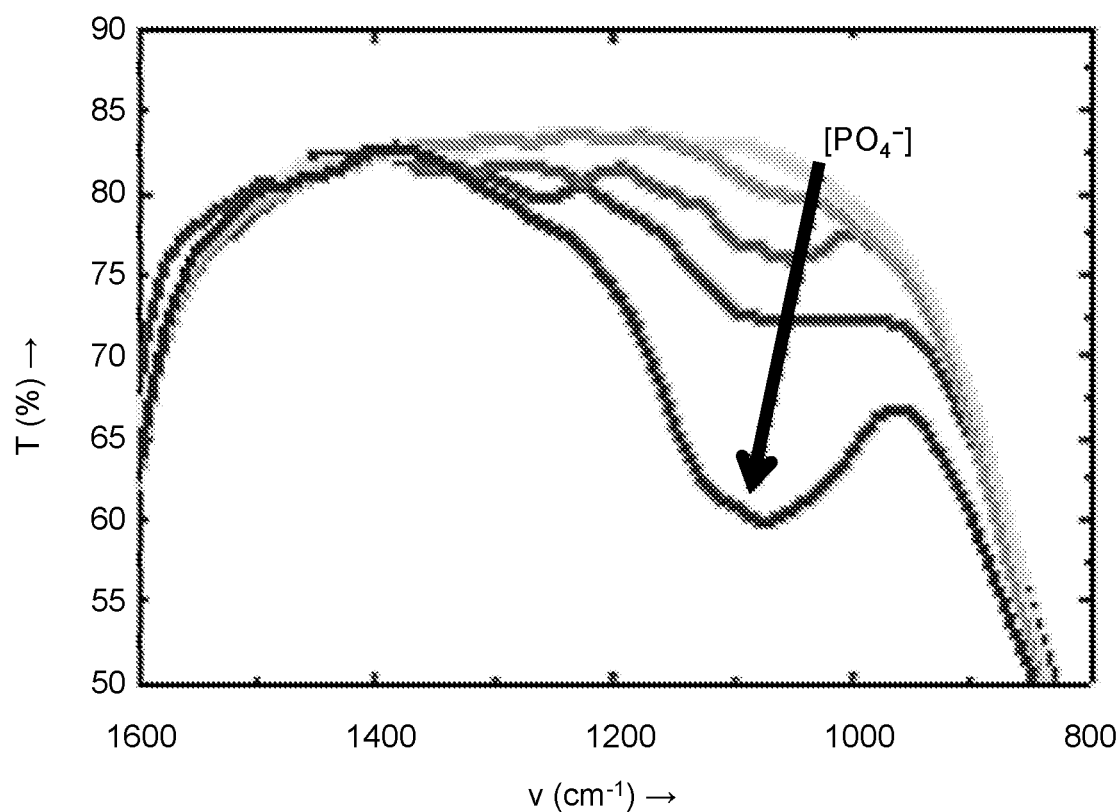
FIG. 5 depicts experimental data obtained in a detection method comprising the use of an optical sensing element in a liquid medium.
Figure 5:
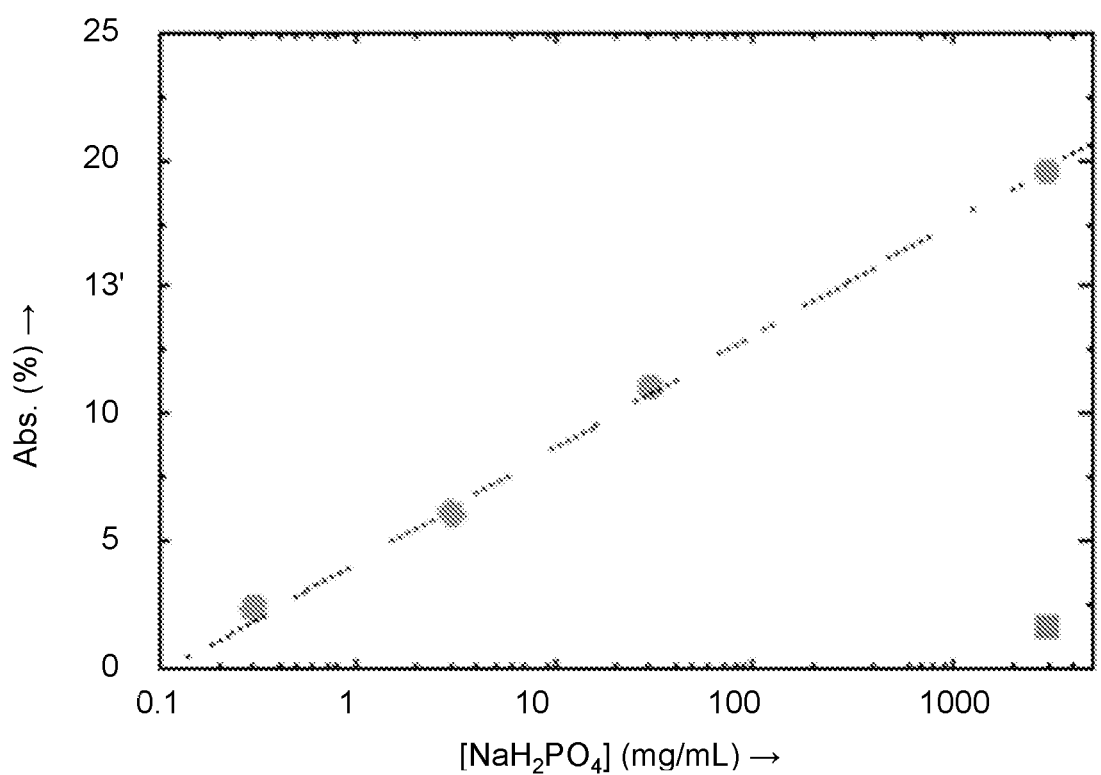

FIG. 5 displays experimental data obtained in a detection method comprising the use of an embodiment of the optical sensing element 10 according to the present disclosure having a zirconium oxide/zirconium hydroxide coating. In the embodiment the waveguide is formed of a silver chloride/bromide fiber loop 10 coated with a one micrometer layer of zirconium oxide (e.g., as shown in FIG. 3). The top graph depicts IR spectra (transmission T-on a scale between 0 and 100%—as function of wavenumber $v$ ($cm^{-1}$)) obtained for aqueous samples with varying concentrations of sodium hydrogen phosphate. The top trace (light grey) was recorded at a concentration of zero milligram $NaH_2PO_4$ per milliliter, the darkest (bottom trace) was recorded at a concentration of three thousand milligram $NaH_2PO_4$ per milliliter. Between each measurement the optical sensing element 10 was regenerated by rinsing with an aqueous solution of NaOH at a pH of 9.5. As can be seen from the top figure presence of phosphate can be demonstrated by a reduction in observed transmission (absorption) at a phosphate specific absorption band at 1050 $cm^{-1}$. As shown, transmission decreases with increasing phosphate concentration. No interference with water was observed, at these wavelengths. The bottom graph shows the relative absorption at the phosphate band as a function of phosphate concentration, wherein data point marked with a round dot correspond to data recorded with the use according to the present disclosure and the data point marked with a grey square represents a comparative experiment recorded using a waveguide without inorganic coating 12. As can be observed the absorption value follows a linear relationship as function of phosphate concentration (on a logarithmic scale). This allows easy, e.g., one point calibration, to calculate an a priori unknown phosphate level in a sample. As can be observed from the bottom graph addition of the zirconium oxide coating provides an about twenty fold increase in detected absorption as compared to an uncoated optical sensing element 10. Increase of obtained absorption was found to scale with length of the coated optical waveguide 11.

Example 2: Gas Detection

The optical sensing elements described herein can also be used to advantage for the detection of analytes in gas phase, e.g. ambient air, or supercritical media. Arranging the sensing element in a glass vessel can allow easy supply of a gas flow containing an analyte to the inorganic coating (sensing area) applied to the optical waveguide 11, which in this example is a fiber loop. Tested analytes include phosphonates, phosphates and arsenates. FIGS. 5-7 depict experimentally, obtained results for triethyl phosphate (TEP) and dimethyl methylphosphonate (DMMP) using a similar optical sensing element 10 as described in example 1.

To obtain a controlled sampling flow, the analyte (liquid) was first injected at a fixed flow rate into a heating system for its vaporization, and subsequently added to a fixed gas flow (carrier gas: nitrogen or dry air). An independent nitrogen/dry air gas flow is fed into a humidifier and thereafter added to the aforementioned gas mixture to allow humidity control of the final sampling analyte.

Figure 6A:
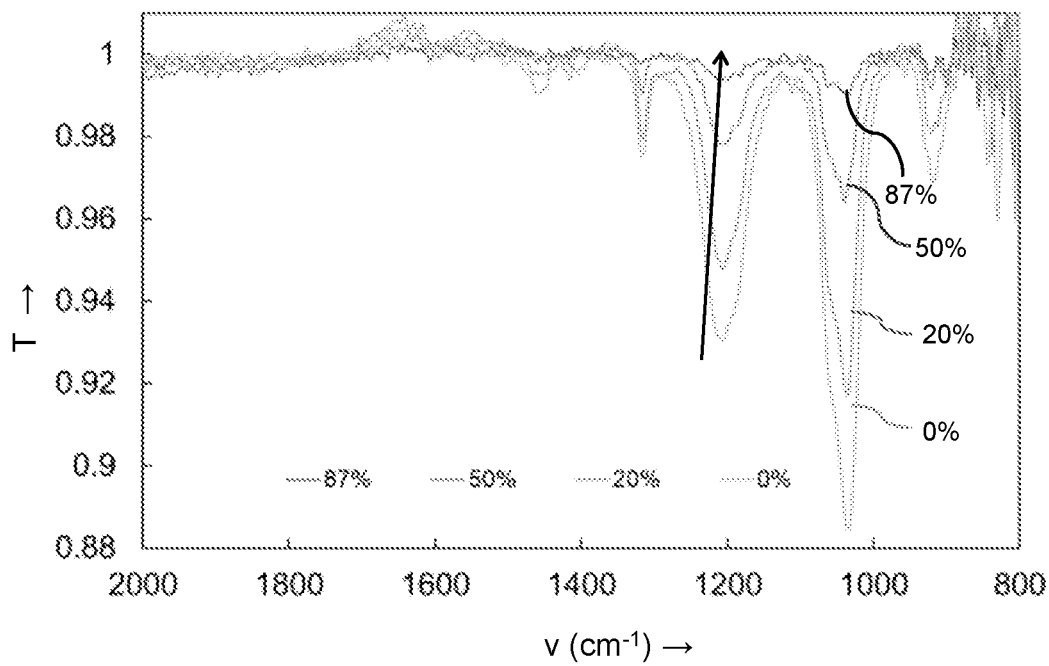
FIGS. 6A and B depict experimental data obtained in a detection method comprising the use of an optical sensing element in gaseous media.

FIGS. 6A and B depict experimental data obtained in a detection method comprising the use of an optical sensing element in gaseous media. FIG. 6A depicts absorption bands of 10 mg/m3 DMMP in air at four different RH levels. Individual relative humidity levels are marked. It was observed that the absorption equilibrium between the analyte and the inorganic coating of zirconium oxide/hydroxide strongly depends on the relative humidity of the medium. FIG. 6A depicts obtained IR data. As can be observed (see arrow), lower humidity yields the highest analyte absorption which is believed to be a result of an apparent shift of the absorption equilibrium towards the inorganic coating.

Figure 6B:
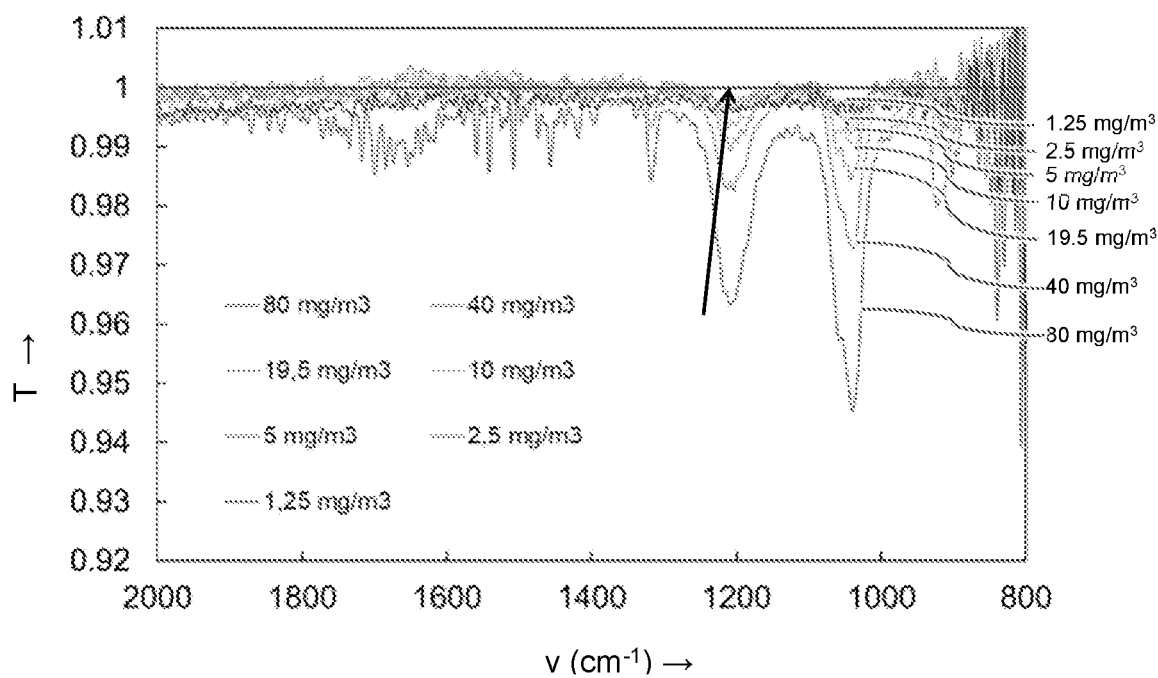

FIG. 6B depicts absorption bands of DMMP at seven different concentrations in air at 87% relative humidity. As can be seen, it was found that, by exposing the optical sensing element to a medium with zero level of analytes, the level of bound analyte was reduced in its entirety. This was found to occur at all humidity levels, hence showing that the sensing mechanism is fully reversible. It was also found that the response time of the reversible absorption/desorption is in the order of several seconds, that is, below one minute, for all humidity levels.

Figure 7A:
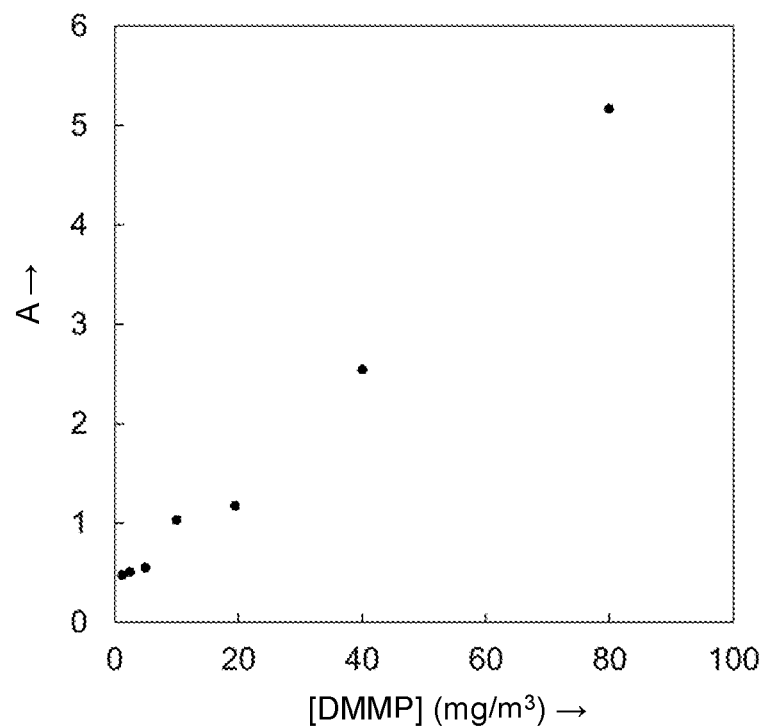
FIG. 7A depicts experimental data obtained in a detection method comprising the use of an optical sensing element in gaseous media.

It was found that the normalized absorption of the analyte follows a linear relationship as function of concentration (See FIG. 7A depicting normalized absorption (area (A)) for DMMP as function of concentration). Note that sensor response in gaseous media was found to scale linearly with analyte concentration, in contrast to experiments in liquid media.

Figure 7B:
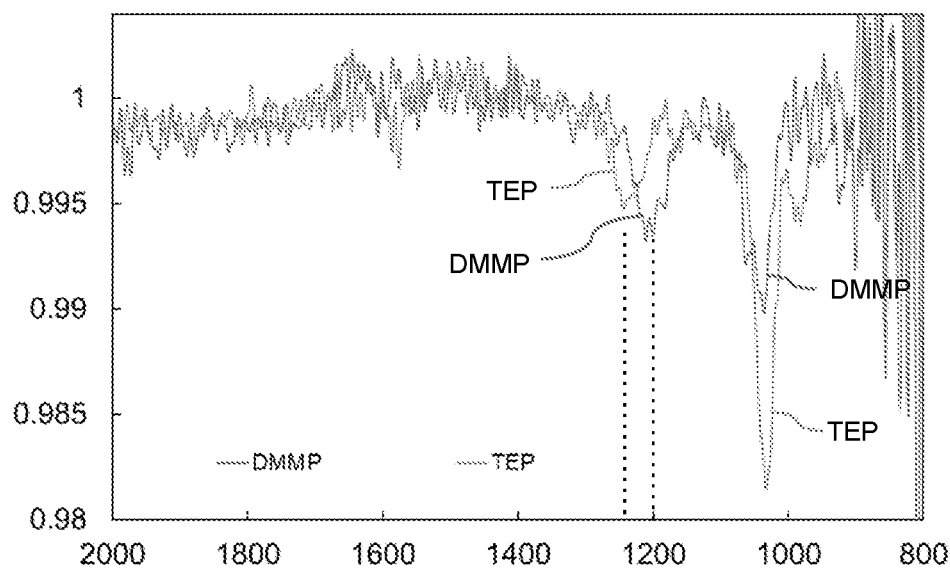
FIG. 7B depicts further experimental data obtained in a detection method comprising the use of an optical sensing element in gaseous media.

The ability to distinguish compounds that differ in their composition, for example, phosphonates and arsenates, is demonstrated by comparing the sensor response of triethyl phosphate to that of DMMP at identical relative humidity and concentration. Reference is made to FIG. 7B, depicting a comparison of absorption of DMMP and TEP, both obtained in air at 87% RH and at a concentration of 10 mg/m$^3$. From the data it is clear that the individual compounds can be positively identified, e.g. by comparing absorption peak position and/or relative peak intensity.

It is noted that at no time could either DMMP or TEP be detected when using an optical sensing element that is lacking an inorganic coating, e.g. a bare loop. The same was found true for detection of analytes in liquid media: at no time could target analytes, e.g. phosphate ions, could be detected when using an optical sensing element that is lacking an inorganic coating. Further it is noted that the inorganic coating does not obscure analyte specific absorption bands, as is e.g. clear from FIGS. 6B, 7B, 5. In contrast, detection of target analytes is expected to be not possible at comparable levels when using organic coatings, as such coatings comprise groups, e.g. alkyl groups, that would obscure absorption bands of the target analytes.

For the purpose of clarity and a concise description, features are described herein as part of the same or separate embodiments, however, it will be appreciated that the scope of the invention may include embodiments having combinations of all or some of the features described. Of course, it is to be appreciated that any one of the above embodiments or processes may be combined with one or more other embodiments or processes to provide even further improvements in finding and matching designs and advantages.

In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different items) or implemented structure or function; any of the disclosed devices or portions thereof may be combined together or separated into further portions unless specifically stated otherwise. Where one claim refers to another claim, this may indicate synergetic advantage achieved by the combination of their respective features. But the mere fact that certain measures are recited in mutually different claims does not indicate that a combination of these measures cannot also be used to advantage. The present embodiments may thus include all working combinations of the claims wherein each claim can in principle refer to any preceding claim unless clearly excluded by context.

The invention claimed is:

1. A method of manufacturing an optical sensing element, for detecting an analyte in a fluid medium, the method comprising:
    providing an optical waveguide comprising an optically transparent material that essentially consists of a metal halide for guiding light through the sensing element;
    depositing an inorganic coating that essentially consists of an inorganic material for adsorbing the analyte from the fluid medium; and
    depositing, prior to depositing the inorganic coating, an adhesion promotion material or precursor thereof, onto the optically transparent material, to form an inorganic adhesion promotion layer that essentially consists of a metalloid, a metal, a metal oxide, a metalloid oxide, or mixtures thereof for promoting adhesion of the inorganic material.

2. The method according to claim 1, wherein the optically transparent material comprises a metal halide that is essentially insoluble in water, and
    wherein the inorganic coating comprises zirconium oxide and/or zirconium hydroxide.

3. The method according to claim 1, wherein the inorganic adhesion promotion layer is configured to provide surface hydroxyl groups for improving adhesion of the inorganic coating at least during deposition of the inorganic coating.

4. The method according to claim 1, wherein the adhesion promotion layer comprises one or more elements selected from the group consisting of: silicon, aluminum, chromium, zinc, and titanium.

5. The method according to claim 1, wherein depositing the inorganic adhesion promotion layer comprises depositing a metal film precursor and oxidizing the metal film to form the adhesion promotion layer.

6. The method according to claim 1, wherein depositing the inorganic adhesion promotion layer comprises vapor or vacuum deposition of an aluminum film or precursor thereto having a thickness in a range between three and twelve nanometer, and
    wherein the aluminum film is oxidized by exposure to water to form the adhesion promotion layer.

7. The method according to claim 1, wherein, depositing the inorganic coating comprises performing a wet chemical deposition step that comprises:
    exposing the optical waveguide, including the deposited inorganic adhesion promotion layer or precursor thereof, to a solution comprising zirconium oxide nanoparticles and/or a zirconium alkoxide precursor solution to form a wet film comprising zirconium oxide and/or zirconium hydroxide, and
    drying the wet film to form a dry coating of the inorganic coating.

8. A method of using an optical sensing element, for detecting an analyte in a fluid medium, that is obtained by the method comprising:

providing an optical waveguide comprising an optically transparent material that essentially consists of a metal halide for guiding light through the sensing element;

depositing an inorganic coating that essentially consists of an inorganic material for adsorbing the analyte from the fluid medium; and depositing, prior to depositing the inorganic coating, an adhesion promotion material or precursor thereof, onto the optically transparent material, to form an inorganic adhesion promotion layer that essentially consists of a metalloid, a metal, a metal oxide, a metalloid oxide, or mixtures thereof for promoting adhesion of the inorganic material;

wherein the inorganic coating comprises zirconium oxide and/or zirconium hydroxide for the detection of a pnictogen compound, in particular phosphate, as the analyte, and wherein the method of using the optical sensing element comprises:

contacting at least a portion the inorganic coating with a fluid medium to be tested for presence of said analyte, measuring an absorption spectrum of light guided through the optical waveguide, and determining a presence or concentration of the analyte based on the measured absorption spectrum.

9. The method according to claim 8, further comprising regenerating, between measurements of the respective absorption spectrum, the inorganic coating by exposing the inorganic coating to an aqueous alkaline solution having a pH in excess of nine.

10. An optical sensing element for detecting an analyte in a fluid medium, the sensing element comprising:

an optical waveguide comprising an optically transparent material that essentially consists of a metal halide for guiding light through the sensing element;

an inorganic coating essentially consisting of an inorganic material for adsorbing the analyte from the fluid medium; and an inorganic adhesion promotion layer that is formed between the optical waveguide and the inorganic coating, wherein the inorganic adhesion promotion layer comprises an adhesion promotion material that essentially consists a metalloid, a metal, a metal oxide, a metalloid oxide, or mixtures thereof for promoting adhesion of the inorganic material.

11. The optical sensing element according to claim 10, wherein the optical sensing element includes a proximal part for dipping into a liquid medium and a distal part staying clear of the liquid medium, wherein the proximal part includes at least a central portion of the optical sensing element provided with the inorganic coating, and wherein the distal part includes both terminal end portions of the optical waveguide.

12. The optical sensing element according to claim 10, wherein the optical waveguide is essentially formed of a silver halide, and wherein the inorganic coating is essentially formed of zirconium oxide and/or zirconium hydroxide.

13. A detector system for detecting a target analyte comprised in a fluid medium, the detector system comprising:

an optical sensing element for detecting the target analyte in a fluid medium, the sensing element comprising:

an optical waveguide comprising an optically transparent material that essentially consists of a metal halide for guiding light through the sensing element;

an inorganic coating essentially consisting of an inorganic material for adsorbing the target analyte from the fluid medium; and an inorganic adhesion promotion layer that is formed between the optical waveguide and the inorganic coating, wherein the inorganic adhesion promotion layer comprises an adhesion promotion material that essentially consists a metalloid, a metal, a metal oxide, a metalloid oxide, or mixtures thereof for promoting adhesion of the inorganic material;

a light source for generating light; and a detector for measuring an absorbance of the light;

wherein the optical sensing element is positioned along a light path between the light source and the detector, wherein the optical waveguide is arranged to guide the light from the light source towards the detector via the light path, and wherein at least a portion of the light path overlaps with the inorganic coating to allow the light to interact with the target analyte.

14. The detector system according to claim 13, wherein the inorganic coating comprises zirconium oxide, and wherein the detector system includes a dispenser for on demand dispensing of an aqueous base to regenerate the inorganic coating.

15. The detector system according to claim 13, further comprising a housing enclosing at least a portion of the inorganic coating and defining an internal volume at said portion for holding an aqueous medium to be tested for a presence of the analyte, wherein the housing further comprises a pair of electrodes configured to electrochemically generate hydroxide species for regenerating the inorganic coating.

* * * * *